Aug. 25, 1931.  N. T. HARRINGTON  1,820,353
PISTON RING
Filed July 22, 1929

INVENTOR
Norman T. Harrington

Patented Aug. 25, 1931

1,820,353

UNITED STATES PATENT OFFICE

NORMAN T. HARRINGTON, OF CLEVELAND, OHIO, ASSIGNOR TO THE SIMPLEX PISTON RING COMPANY OF AMERICA, INC., OF CLEVELAND, OHIO, A CORPORATION OF OHIO

PISTON RING

Application filed July 22, 1929. Serial No. 380,106.

The invention relates to piston rings of the type having axial resiliency and sealing faces held in contact with the opposite sides of the ring groove by the resilient pressure. It is usual to construct such rings of a single blank which is provided with series of overlapping circumferential slots. With the present improved construction instead of a single ring, two separate rings are constructed to co-act with each other to produce the desired effect. The invention therefore consists in the construction of such rings as hereinafter set forth.

Figure 1:
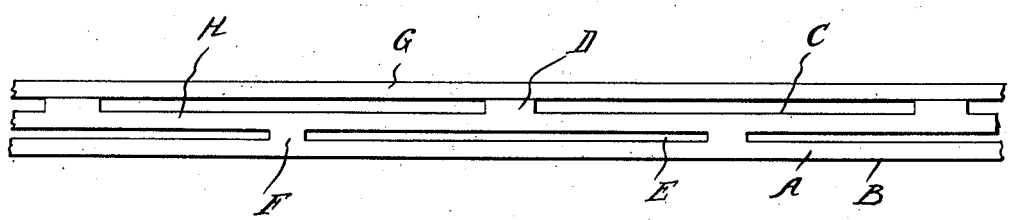
Figure 1 is a side elevation showing a development in a single plane of a pair of co-operating rings.

As shown in Figure 1, A is a ring blank having a plain face B on one side thereof and a face C on the opposite side provided with projecting lugs D at suitably spaced intervals. The ring is further provided with a series of circumferential slots E arranged opposite each of the lugs D and extending symmetrically upon opposite sides thereof but separated from each other by an un-cut portion F. G is a plane ring which is placed adjacent to the ring A on the side of the lugs D. The combined axial dimensions of the rings A and G is somewhat greater than the axial dimensions of the ring groove in which they are to be placed so that to insert them in such groove it is necessary to bend the bars H which are between the slots E and the face C. This will develop a predetermined axial expansive pressure which will hold the ring G and also the face B of the ring A in sealing contact with the opposite faces of the ring groove.

Figure 2:
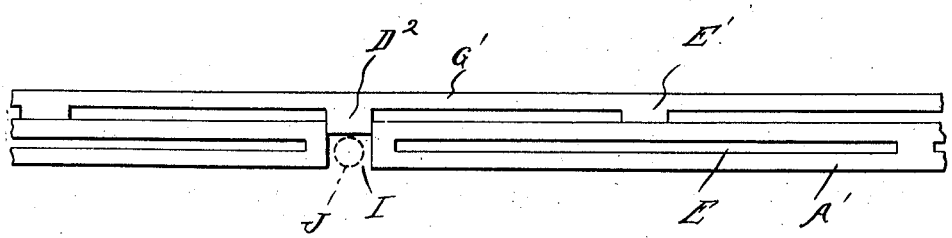
Figure 2 is a similar view illustrating a modified construction.

With the modified construction shown in Figure 2 the ring A' is formed with plain faces on opposite sides thereof and with a series of slots E similar to those in Figure 1. The ring G' instead of having plain faces is provided with a series of inwardly projecting lugs E' which are arranged to be centrally opposite the slots E. There is also preferably one lug D² which is of greater axial dimension than the lugs D' and which is adapted to engage a slot I in between the ends of the ring A' on opposite sides of the transverse split. Thus this lug D² will hold the rings A' and G' from relative rotation and will properly register the lugs D' with the slots E. If desired, the combined rings may be held from rotation by a pin J which also enters the slot I and is attached to the piston.

With the construction as above described, the sections A and G are arranged in pairs but are interchangeable with the corresponding sections of other rings. Thus in case of the breakage of one member of a pair it may be replaced by another corresponding member while still utilizing the companion member. When, however, the pairs of rings are placed in a ring groove they function as a unit and will produce an oil and gas seal with both sides of the groove.

What I claim as my invention is:

1. A piston ring comprising a pair of ring members, one of which is formed with opposite parallel plain faces with intermediate circumferentially extending slots and being trans-split at one point, and the other of said members having an outer plain face and axially inwardly extending lugs arranged for registration with said slots and a single lug of greater axial depth adapted to enter the slot formed by the transverse split in said first mentioned faces.

2. A piston ring comprising a pair of transplit ring members, one of which is provided with a series of axially projecting lugs circumferentially spaced thereabout, one of said members formed with a single series of circumferentially extending slots, the slots of said series being adapted to register with the projecting lugs and one of said members having a lug of greater axial depth than said first mentioned lugs adapted to enter the slot formed by the transverse split in the other of said members.

In testimony whereof I affix my signature.

NORMAN T. HARRINGTON.